(12) United States Patent
Parulekar

(10) Patent No.: US 12,556,580 B2
(45) Date of Patent: Feb. 17, 2026

(54) SYSTEMS AND METHODS OF A CLOUD SECURITY ENGINE (CSE) WITH INTELLIGENT DECISION MAKING

(71) Applicant: Invi Grid Inc., Sunnyvale, CA (US)

(72) Inventor: Yogita Parulekar, Sunnyvale, CA (US)

(73) Assignee: Invi Grid Inc., Sunnyvale, CA (US)

( * ) Notice: Subject to any disclaimer, the term of this patent is extended or adjusted under 35 U.S.C. 154(b) by 557 days.

(21) Appl. No.: 17/890,221

(22) Filed: Aug. 17, 2022

(65) Prior Publication Data

US 2023/0269276 A1 Aug. 24, 2023

Related U.S. Application Data

(60) Provisional application No. 63/234,575, filed on Aug. 18, 2021.

(51) Int. Cl.
*H04L 9/40* (2022.01)

(52) U.S. Cl.
CPC .............. *H04L 63/20* (2013.01); *H04L 63/10* (2013.01); *H04L 63/205* (2013.01)

(58) Field of Classification Search
CPC ...... H04L 63/20; H04L 63/205; H04L 9/0894
See application file for complete search history.

(56) References Cited

U.S. PATENT DOCUMENTS

| | | | |
|---|---|---|---|
| 9,578,066 B1 * | 2/2017 | Prafullchandra | H04L 63/20 |
| 10,643,002 B1 * | 5/2020 | Veselov | G06F 21/00 |
| 2020/0278920 A1 * | 9/2020 | Khakare | G06F 9/547 |
| 2020/0382556 A1 * | 12/2020 | Woolward | H04L 63/20 |
| 2022/0294816 A1 * | 9/2022 | Martin | H04L 63/20 |
| 2023/0088034 A1 * | 3/2023 | Salman | H04L 63/205 726/1 |

* cited by examiner

*Primary Examiner* — Patrice L Winder
(74) *Attorney, Agent, or Firm* — Deepali Brahmbhatt

(57) ABSTRACT

The systems and methods of the cloud security engine for secure cloud configuration with decision intelligence and automation with an easy to use point and click interface: providing pre-coded, pre-tested, customizable secure configuration baselines, policies with options for adoption or adaptation with changes and approval workflows for the organization, environment, deployment or resource; providing drag and drop architectures, modules or components pre-seeded automatically with one or more secure configurations; providing guidance and decision intelligence for adopting or adapting and implementing the one or more secure configurations; automatically and autonomously applying the one or more secure configurations at build, deploy, monitor and run time based on context and risk information for a cloud environment; automatically analyzing and creating configurations for security; tracking and reporting with workflows, setup and status adoption, changes, exceptions, adaption, implementation of the one or more secure configurations.

20 Claims, 16 Drawing Sheets

SYSTEMS AND METHODS OF A CLOUD SECURITY ENGINE (CSE) WITH INTELLIGENT DECISION MAKING

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

This application claims priority to the U.S. Provisional Patent Application No. 63/234,575 filed Aug. 18, 2021.

FIELD OF THE INVENTION

The present invention is in the technical field of securing cloud-based infrastructure, services, applications and software component deployments. The invention enables users to design, implement, deploy and manage secure cloud-based architectures, modules and components, and provides pre-coded, pre-configured components, policies and architectures to enable an organization's infrastructure and software development, deployment and operations personnel to easily select, set up and deploy secure, security-framework-compliant and tested cloud infrastructure, configuration elements and components. The invention provides security-related policy recommendations based on different auto-detected parameters and configurations. In addition, the present invention performs assessments of cloud-based infrastructure, applications and software, to help eliminate or reduce security-related risks. The developer of the cloud application does not have to build code related to cloud infrastructure or security policy and can rapidly build and deploy a secure cloud infrastructure, services and software components across multiple clouds, with guided decision intelligence for modeling, configuration, testing, deployment, drift detection and issues monitoring, remediation, reporting and management, with rules and workflows for secure cloud infrastructure, services, applications and software components. Deployments across multiple cloud services will be enabled by the invention's automated infrastructure coding component and policy abstraction layers. The invention will be the de-facto interface for secure cloud deployments and management. It supports security governance with pre-coded policies, pre-coded and configurable change rules, approvals, alerting, deviations, exceptions, guided remediation, escalation and completion tracking. It will be a marketplace for secure modules, architectures and configurations by third-party technology vendors/suppliers of cloud software and service components.

BACKGROUND

Organizations lack the resources and ability to securely, rapidly, consistently and continuously deploy, operate and maintain cloud-based infrastructure, services and software while implementing industry-recognized security practices and standards. This frequently results in vulnerable cloud infrastructure, applications and services, and thus subsequent data breaches.

This happens because: (i) Organizations increasingly move to cloud services, but lack sufficient human resources, skillsets and expertise when new cloud infrastructure and services are being implemented, deployed and maintained. (ii) Secure cloud infrastructure and software design, development and deployment skills that are in high demand and short supply tend to be highly specialized and complex, and are outside the reach of many organizations, especially when exacerbated by cost constraints, demand for rapid time-to-deploy and rapid time-to-market business initiatives. (iii) Specialized security teams are typically overburdened and reactive, and can rarely scale to meet business needs. (iv) Cloud "shared responsibility" models are not well understood or implemented by most developers and IT operations staff. (v) Building the consistency that is necessary for solid security processes and practices is even more difficult and challenging. (vi) Organizations fail at exceedingly increasing rates as the complexity of cloud computing and the prevalence of cloud-based software solutions increase daily. (vii) The challenges of continuous monitoring and secure configuration management further disable even the best teams.

Organizations of all types and sizes have significant challenges hiring skilled and experienced cybersecurity architects, engineers and compliance team members that are in persistent short supply. Even if available, these personnel cannot meet today's demands for rapid design and deployment of secure architectures, systems and services with current, time-intensive workflows. The transition to cloud services demands additional, even more specialized skill sets than most organizations have or can obtain.

Existing technologies and solutions do not work for several reasons. Existing third-party tools and services do not bridge these gaps. While cloud service providers provide rapidly deployable IT infrastructure, businesses and other organizations remain responsible for securely deploying and maintaining their cloud environments.

Manual labor is unable to securely deploy and rapidly scale cloud infrastructure using current tools and methods which are complex and specialized, still adapting from legacy to cloud requirements, requiring months of costly training, long organizational adoption timelines and expensive integration. The situation becomes even more challenging given the complexity, rapid change and necessity of managing inevitable configuration drift and ongoing compliance requirements.

Other current third-party solutions are disconnected, continue to need expertise, do not have context, are reactive and require copious manual effort to reduce the "noise" of alerts and errors after the fact, often after data has been breached which diverts security team resources in another direction (incident response and remediation).

Note that different developers of cloud applications have the same focus and intent to build secure systems, but they lack tools and capabilities that would allow them to design and deploy such systems with ease and efficiency.

SUMMARY OF THE INVENTION

The present invention is systems and methods of a Cloud Security Engine (CSE) with decision intelligence, for: designing cloud architectures; providing context and workflows for the cloud-based deployments; recommending security configurations and policies for the cloud-based deployments; adapting the cloud-based deployments to incorporate the recommendations for security.

The systems and methods comprising a Cloud Security Engine with decision intelligence for automated, guided design, modeling, building, configuration, deployment and implementation of secure cloud architectures, modules, components and environments operable within a cloud service provider platform in a drag and drop, point and click interface and plug and play components: providing one or more pre-coded, pre-built, pre-configured, pre-tested, framework-compliant components with security pre-seeded in and that are operable within the cloud service provider platform; pre-defining one or more framework-compliant cloud architectures or modules with security pre-seeded in and comprised of pre-coded secure framework-compliant components operable within the cloud service provider platform; receiving user-configurable customizations for one or more secure framework-compliant components; designing one or more cloud architectures using the said one or more of the provided components, or the components customized using the user-configurable customizations; selecting one of the designed cloud architectures for simulation; simulating and testing a model of a cloud environment with the selected designed cloud architecture that provides for security compliance; collecting and maintaining context and risk information for the cloud environment autonomously, or from system owners, or users; mapping the collected context and risk information to pre-coded policies for a secure configuration; automatically incorporating the secure configuration from the context and risk mapped pre-coded policies into the components and architectures for cloud environment at design, model, build, test, or deploy phase; allowing for requesting, approving and tracking exceptions based on the automatically incorporated secure configuration; deploying the selected, designed, secured cloud architecture in the cloud environment.

The systems and methods of the CSE, further comprising: adding or modifying the cloud environment by adding or removing components that are customizable plug and play components.

The systems and methods of the CSE, wherein the components are infrastructure or architecture components for services or applications.

The systems and methods of the CSE, wherein the Cloud Security Engine includes drag and drop user interface for using one or more of the components with optional user customization.

The systems and methods of the CSE, wherein the cloud environment includes cloud infrastructure, cloud services or cloud software applications.

The systems and methods of the CSE, further comprising: designing, building, deploying and implementing secure multi-cloud architecture, infrastructure or environment.

The systems and methods of the CSE, further comprising: modeling, designing, building, configuring, testing, deploying and implementing secure hybrid cloud architecture, infrastructure and environments.

The systems and methods of the CSE, wherein the secure cloud environment is compatible with one or more Cloud Service Providers (CSPs) including, but not limited to: Amazon Web Services (AWS), Google Compute Platform (GCP) and Microsoft Azure as well as third party solutions, partners and SaaS providers.

The systems and methods of the CSE, wherein the cloud environment is compatible with private clouds.

The systems and methods of the CSE, wherein the Cloud Security Engine provides a user interface for designing, modeling, simulation, testing, staging and deploying.

The systems and methods of the CSE for secure cloud configuration with decision intelligence and automation for risk based configuration, implementation, deployment, monitoring and remediation for cloud infrastructure, services and application deployments within one or more cloud environments, with an easy to use point and click interface: providing pre-coded, pre-tested, customizable secure configuration baselines, policies with options for adoption or adaptation with changes and approval workflows for the organization, environment, deployment or resource; providing drag and drop architectures, modules or components pre-seeded automatically with one or more secure configurations; providing guidance and decision intelligence for adopting or adapting and implementing the one or more secure configurations; automatically and autonomously applying the one or more secure configurations at build, deploy, monitor and run time based on context and risk information for a cloud environment; automatically analyzing and creating configurations for security; tracking and reporting with workflows, setup and status adoption, changes, exceptions, adaption, implementation of the one or more secure configurations.

The systems and methods of the CSE, wherein the point and click interface further comprising a user interface that includes reviewing, authoring, approving, adopting, adapting, modifying the configuration baselines, policies or options.

The systems and methods of the CSE, further comprising: applying, testing or implementing automatically or autonomously context aware variations and approved exceptions for the configuration baselines, policies or options at design; modeling, testing, deployment and monitoring stages, and configuring and maintaining workflow, setup and status.

The systems and methods of the CSE, further comprising: point in time and ongoing reporting of the risk score or level of the cloud environments; and mappings of drifts and deviations from secure configuration options adopted, adapted or autonomously applied to architectures and components built and deployed with the engine along with their severity and priority levels based on policy, context and risk.

The systems and methods of the CSE, further comprising: escalating configuration issues, changes or time-based alerting related to risk and non-compliance with organizational or standards-based policies; or requesting, approving and maintaining exceptions; guiding remediation action with fix intelligence or automatically; and autonomously remediating with scheduling, tracking testing and deployment to maintain security for the cloud environment.

The systems and methods of the CSE, wherein the secure cloud environment includes cloud infrastructure services or software applications.

The systems and methods of the CSE, further comprising: continuously maintaining, implementing or deploying to support orchestration of a multi-cloud environment or a hybrid cloud environment.

The systems and methods of the CSE, wherein the secure cloud environment is compatible with one or more Cloud Service Providers (CSPs) including, but not limited to: Amazon Web Services (AWS), Google Compute Platform (GCP) and Microsoft Azure as well as third party solutions, partners and SaaS providers.

The systems and methods of the CSE, wherein the secure cloud environment is compatible with private clouds.

The systems and methods of the CSE, wherein architectures of the secure cloud environments pre-seeded with secure configurations applied based on context and risk is displayed diagrammatically in a user interface.

BRIEF DESCRIPTION OF THE DRAWINGS

The embodiments of this invention are illustrated by way of example and not limitation in the figures of the accompanying drawings, in which like references indicate similar elements and in which.

DETAILED DESCRIPTION OF THE INVENTION

Figure 1:
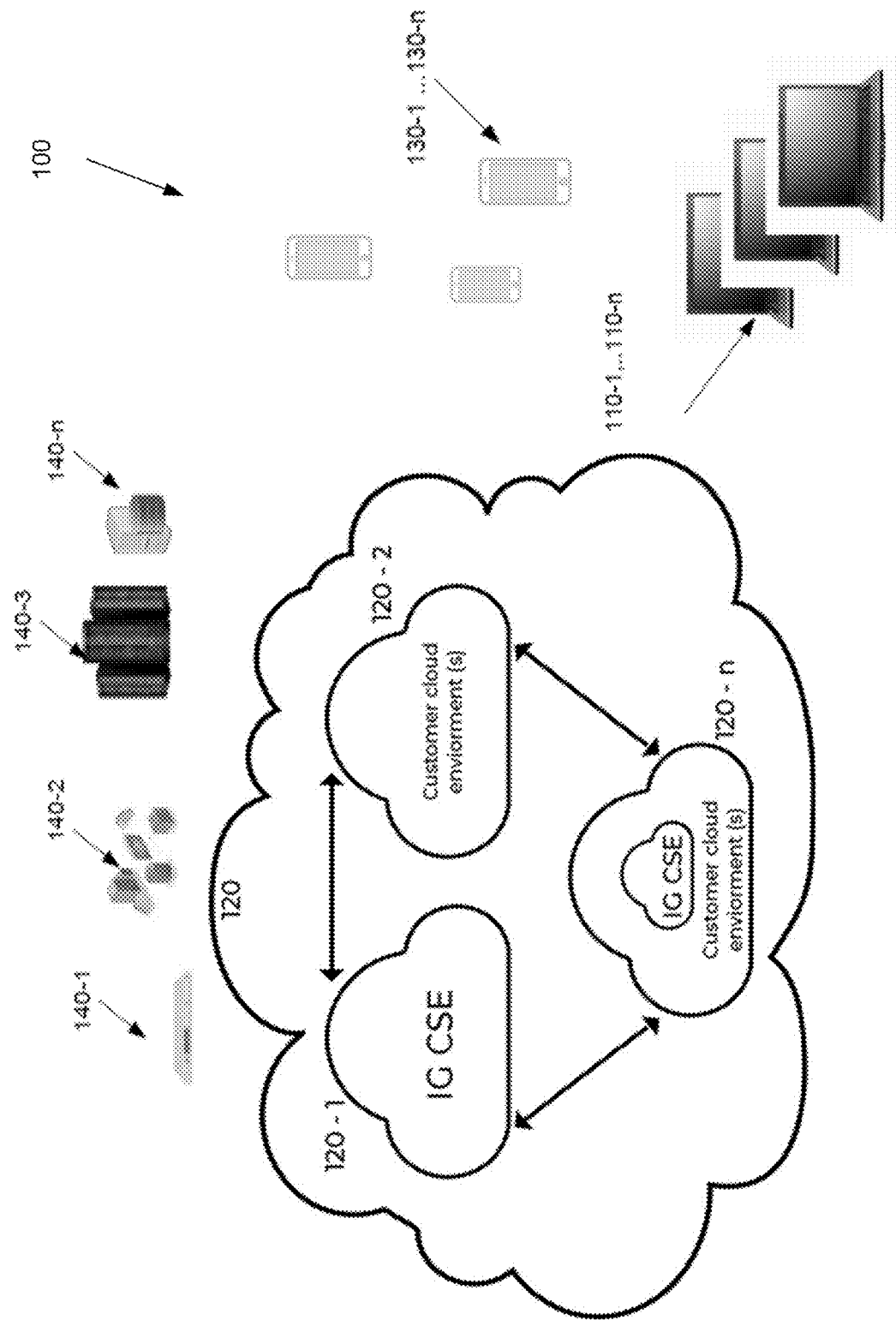
FIG. 1 shows a diagram illustrating an example of systems and methods systems of the invention, the Cloud Security Engine (CSE), with different types and categories of computing devices including virtual devices.

The systems and methods of Cloud Security Engine (CSE) includes techniques to incorporate pre-tested and pre-built secure components and policies based on contextual work flow for a cloud-based deployment. The design incorporating the security recommendations can be tested and audited for on-going security compliance issues. Drifts from the known secure point(s) can be remediated by guided and automated processes.

The solution supplements and complements organizational cloud security expertise proactively with smart, "out-of-the-box", pre-coded, pre-configured, rapidly deployed, tested, multi-framework compliant secure cloud infrastructure, services and software components and modules. Components, modules (collection of components) and use case driven architectures pre-coded, pre-tested, ready, available and secured with pre-coded, tested contextualized configuration policies to proactively defend against known threat types and risks from day one of deployment. A decision intelligence system is embedded in the solution for guided adoption or adaptation/configurability to meet specific enterprise needs, at various steps in the infrastructure deployment life-cycle, from model to deployment to monitor and remediate.

A Cloud Security Engine for Build (CSE-Build) is a system for architectural design and development with decision intelligence for automated, assisted or guided design, modeling, building, configuration, deployment and implementation of secure framework-compliant cloud architectures, modules, components and environments operable within a cloud service provider platform.

Examples of pre-coded, pre-built, pre-configured and pre-tested secure framework-compliant components include cloud services such as the following to which security configurations will be automatically applied based on policies, context and risk: Computing Services, Networking, Database, Data Storage, Identity and Access Management, Encryption and Key Management, Workload Management, Logging Monitoring and Alerting, Frontend and Backend Web Services, API Management, Workflow Management, among other commonly used cloud-based components and services.

Some of the architectures that include various combinations of components and secure configurations can also be predefined. Examples include architectures with pre-seeded secure configurations customizable in drag and drop, point and click interfaces for Mobile Applications and Services, Website Applications and Services, Operational Cloud Services, and Internet of Things, among others.

Examples of user-configurable customizations for one or more secure framework-compliant components include specific details such as individual user and group permissions and access profiles, encryption algorithms and key management settings, file permissions and data access profiles, risk categorization and prioritization, data flows and associated controls, data storage and encryption parameters, organization-specific policies and controls, logging specifications and requirements such as retention periods, monitoring specifications, alerting specifications, operational and governance controls and approval workflows, among others.

The system components customized using the user-configurable customizations can be leveraged as follows: with exceptions to policies and configurations based on the context, risk, applicable regulations, standards, threat levels, data type and data sensitivity.

The solution easily and automatically scales, reducing the need for increasing manual labor by across-the-board cloud security staff (cloud security architects, security engineers, compliance teams and IT staff) in organizations that are unable to fulfill the requirements and resources for deploying and maintaining secure cloud technical infrastructure and software. The decision intelligence engine equips the cloud build and security teams to build strong defenses against known risks rapidly and with the agile speed that the business requires.

The solution fills the gap between cloud service provided infrastructure and services and the requirements posed by "shared responsibility service models" that are mandated in cloud service contracts while supporting broad, tested regulatory and compliance frameworks. The solution complements organizational staffing and engineering team resources with proactive, built-in "smart", guided end-to-end expertise. This is the "IG Cloud Security Engine (CSE) with a decision intelligence system" that enables teams to make smart decisions along the way and deploy securely and manage to the highest standards.

The IG Cloud Security Engine's (CSE) decision intelligence system empowers the cloud architect and security engineer with recommendations, context and workflows through their entire cloud journey from authoring, configuring, modeling, testing, deploying, remediating and managing secure clouds with strong embedded defenses from ongoing risks on day one of provisioning.

For example, the invention provides guidance based on automated decision intelligence for adopting or adapting and implementing secure configuration for cloud-based architectures, plug-n-play modules and components. A cloud architect or a cloud engineer may select, design, or custom configure components that have been pre-coded and pre-configured to be secure upon first use and with ongoing operations. This may be accomplished when building or maintaining cloud infrastructure and environment for a web application, a mobile application or many other types of applications and services. The need for complex coding and security configuration of cloud infrastructure, services and environments by staff is eliminated because the heavy lifting has been previously coded and built into the Cloud Security Engine. The Cloud Security Engine permits customizations to meet organizational requirements within the context of desired organizational security policy and risk parameters using pre-defined logic which algorithmically assists in decision making. Guidance based on asset risk profile, configuration policy weights or importance relative to the asset, regulatory mandates, best practice standards and current threat environment is provided for decision making through designing, testing, deploying and monitoring the cloud infrastructure services and environment. The Cloud Security Engine also provides governance and management tools, for example, recommending mitigation options when more secure options cannot be taken for technical reasons, or requesting and managing time-based and risk-based exception management allowing organizations to manage escalation of issues and risks.

For example, the invention allows for feedback on any user customization with automated decision intelligence-based guidance or recommendations. When configuring a cloud service, the Cloud Security Engine provides intelligent, guided, security-aware options for configuration. Users are provided with guidance on the relative importance of the control given the context and risk level of the environment the components will be deployed in. For example, certain controls may be mandatory or best practice guidance based on the context, risk and regulatory environment. Failure to follow recommended practices and standards results in the display of increased risk scores that are quantified in the CSE dashboard, along with specific recommendations for resolution, and options for automated "Fixes" which can be easily applied with a point-and-click button interface.

The solution provides tested security configurations and policies and guides the security engineer and the cloud architect with background and intelligence to adopt or adapt the policies with context and configurability rules, at various stages in the journey to secure cloud adoption including, policy setup, cloud infrastructure, services and software components modeling, deployment, monitoring, remediation and management. The decision intelligence engine guides the security engineer and cloud architect with context and recommendations.

The invention applies equally to a cloud architecture, a cloud infrastructure or a cloud environment. Examples, include design and provision of cloud components independently or together in various combinations as cloud architecture and in possible different use case environments such as for enterprise applications or a Software-as-a-Service (SaaS) application. These components can be cloud infrastructure services such as cloud networking or cloud compute or cloud storage service.

For example, the invention includes designing, building, deploying and implementing secure multi-cloud architecture, infrastructure or environment. This includes availability and management of all CSE functions and services across different Cloud Service Providers and on-premise solutions at once, for supporting and managing the same level of security organizational policies across-the-board, managing risk across all organizational assets.

For example, the invention includes modeling, designing, building, configuring, testing, deploying and implementing secure hybrid cloud architecture, infrastructure and environments. Using a drag-and-drop graphical user interface, infrastructure, services and application designs may be selected and assembled. The CSE provides elements and components to build designs as secured elements and components which can ultimately be tested, staged, deployed and orchestrated.

The solution provides pre-coded tested security policies that can be adopted out-of-the-box and automatically codes for policies that are adapted for contextualization and reconfigurations to enterprise needs. The solution then automatically codifies the cloud infrastructure, services and software component deployments with encapsulated security policies that are based on:

(i) Applicable regulations, standards, best practice baselines for multiple cloud service providers and across multi-cloud, hybrid environments. (ii) Contextual metadata information obtained from the user or obtained automatically, such as sensitivity/classification of the data, nature and type of information assets, risk level and potential threats, through queried, built-in smart guidance and expertise. (iii) Configuration policy changes, exceptions and deviations that can be made, approved, recorded, reported and escalated based on rules and workflows setup according to enterprise needs.

The solution provides for the ability to assign contextual and metadata information at various levels in resource hierarchy including but not limited to: System and business ownership; Risk level and potential threats; Sensitivity/classification of data to be held/processed; Nature and type of information assets and operations to be deployed within and the overall asset risk profile levels.

The solution provides pre-coded, pre-tested, drag and drop, plug and play cloud components, modules (pre-coded collection of components) and architectures that have security policies and frameworks predefined and designed-in based on applicable baselines and compliance standards that can further be contextualized and modified to meet business and technical needs.

The solution automatically codes for the organization's cloud infrastructure, services, and software component deployments as the user models, tests and deploys with the plug and play components, modules and architectures that are prebaked with security.

The solution continuously monitors for drifts from secure pre-defined, standard-compliant architectures, components, configurations and services that are deployed using the IG Cloud Security Engine (CSE).

The solution also continuously checks for policy compliance issues against IG tested policies for cloud architectures deployed pre or sans-IG cloud security engine (CSE).

The CSE decision intelligence system auto fixes the issues with a guided well-informed and transparent remediation process to ensure compliance with the enterprise approved and IG pre-tested policy configurations. Complete compliance reporting, exception management and escalation are all built-in.

For example, the invention provides pre-coded, pre-tested, customizable secure configuration baselines, policies or options for adoption or adaptation with changes and approval workflows, for the organization, environment, deployment or resource. For example, baselines include policy requirements, organizational requirements and/or standards-based requirements, or in other words, what an organization must do to attain secure configuration, manage security risk, and meet relevant mandates per management or regulatory requirements. Baseline policies may be adopted by the user as provided in the CSE without modifications or adapted to conform to specific organizational requirements.

Security pre-seeded in components automatically provides secure configuration. The security baselines that are either provided or user customized are automatically selected based on context and risk and further automatically incorporated when components are dragged and dropped, architectures are designed and built using the graphical user interface, enabling rapid and secure cloud deployments.

The solution's decision intelligence engine guides monitoring and remediation with contextual and specific fixes for drifts and policy compliance issues that can be tested in non-live environments, approved and then rapidly deployed in live environments supporting agile processes. The solution provides the ability to choose the resources to which the fixes can be applied along with workflows for managing exceptions.

The solution provides policy and security requirements at the time of provisioning that may be deployed automatically and immediately, eliminating significant manual work effort and time delays. This enables rapid and scalable cloud infrastructure compliance management, reporting, remediation and governance.

The present invention can be applied in different industries, technology areas or verticals. The solution is industry agnostic and is widely applicable to any customer using cloud services, but will definitely be adopted first and foremost by industries with regulatory requirements. This includes industries and verticals such as healthcare or those processing health data, merchants processing and storing payment card data, banking and financial sector as well as critical government and utility infrastructure entities and suppliers governed by new and existing laws, regulatory and compliance requirements. Any organization with a cloud solution can adopt this cloud security engine to rapidly and securely deploy cloud infrastructure.

Compliance standards include, but are not limited to SOC2, HIPAA, PCI DSS, NIST/FISMA/FedRAMP/DFARS, CJIS, FDA 21 CFR Part 11, and so on.

Solution will provide for deployment and monitoring in multi-cloud and hybrid cloud environments spanning multiple cloud service providers including but not limited to Amazon Web Services (AWS), Google Compute Platform (GCP) and Azure as well as private clouds. Secure architectures, workloads, policies and configurations will be made deployable and portable across multiple cloud service providers. Users can rapidly build and deploy secure cloud infrastructure, services and software components in one cloud service and then migrate those items across multiple vendor service clouds. These deployments across multiple cloud services will be enabled by the invention's automated infrastructure coding and component and policy abstraction layers. These abstraction layers will apply cloud-specific technical requirements to configurations that are relevant in one cloud service such that the security policies and security configuration details are retained in-tact within the other service or services, but without added user coding efforts.

The solution provides a rich marketplace for secure modules, architectures and configurations by third-party technology vendors/suppliers. This will make use of application programming interfaces (APIs), hooks, templates, other software tools together with secure authentication, authorization and encryption protocols.

The solution benefits Managed Service Providers (MSPS) by accelerating secure service deployments and services for customers. The solution reduces friction for Cloud Service Providers (CSPs) by enabling adoption, agility and security by any organization. Adoption is propelled by strong tailwinds in the following areas, all of which our solution provides for: (i) No-code or low-code solutions; (ii) Shift left security; (iii) Regulations, standards and compliance requirements; (iv) Ongoing shortage of cloud security expertise; (v) Increasing complexity of cloud security, (vi) attack surfaces and increasing number of security breaches.

FIG. 1 shows a diagram illustrating an example of systems and methods systems of the invention, the Cloud Security Engine (CSE), with different types and categories of computing devices including virtual devices. In one embodiment, as depicted in FIG. 1 different types of computing devices connect to the Cloud Security Engine (CSE) architecture 120. In the example of FIG. 1, different possible devices have been shown 110-1 through an nth client system 110-n, smartphones from 130-1 to 130-n, servers from 140-1, . . . 140-n. The computing devices with end-users is separated from the use of the computing devices in hosting applications, backend or server side in the Cloud Security Engine (CSE) architecture 120.

In an implementation, Cloud Security Engine (CSE) architecture 120 may be accessible on the internet through secure protocols and strong authentication, authorization and encryption systems and processes. In an example implementation, 120 or any part of it can be inside a secure corporate wide area network or it can be in one or more cloud environments (public or private).

An entity or user designing a new cloud-based infrastructure, services, applications and software components will use the Cloud Security Engine's (CSE) pre-coded cloud-based architectures and compliant components. The Cloud Security Engine (CSE) helps to design the entire cloud-based deployment to be secure.

A person of ordinary skill in the art would appreciate that by integrating Cloud Security Engine (CSE) recommendations and policies at the time of design, the deployment of the cloud-based infrastructures, services, applications and software components become secure from the start. Cloud-based architectures that already exist can go through the assessment process of the Cloud Security Engine (CSE).

The messaging and notification between different components can be implemented using application programming interface (API) calls, Javascript, extensible markup language ("XML") or Javascript Object Notation ("JSON") config file interfaces between different interfaces, Hypertext Preprocessor (earlier called, Personal Home Page) ("PHP"), Python, Node.js, Java/C++ object-oriented programming or web-based tools.

Different components may also implement authentication, authorization and encryption to keep the data and the requests secure. Authentication of a device, user and service may be accomplished using public/private key, passwords, token, transaction, biometrics, multi-factor authentication or other methods known in the industry. Encryption may use data encryption standard (DES), TripleDES, RSA, Advanced Encryption Standard (AES) or other cryptographic methods known in the industry.

Figure 2:
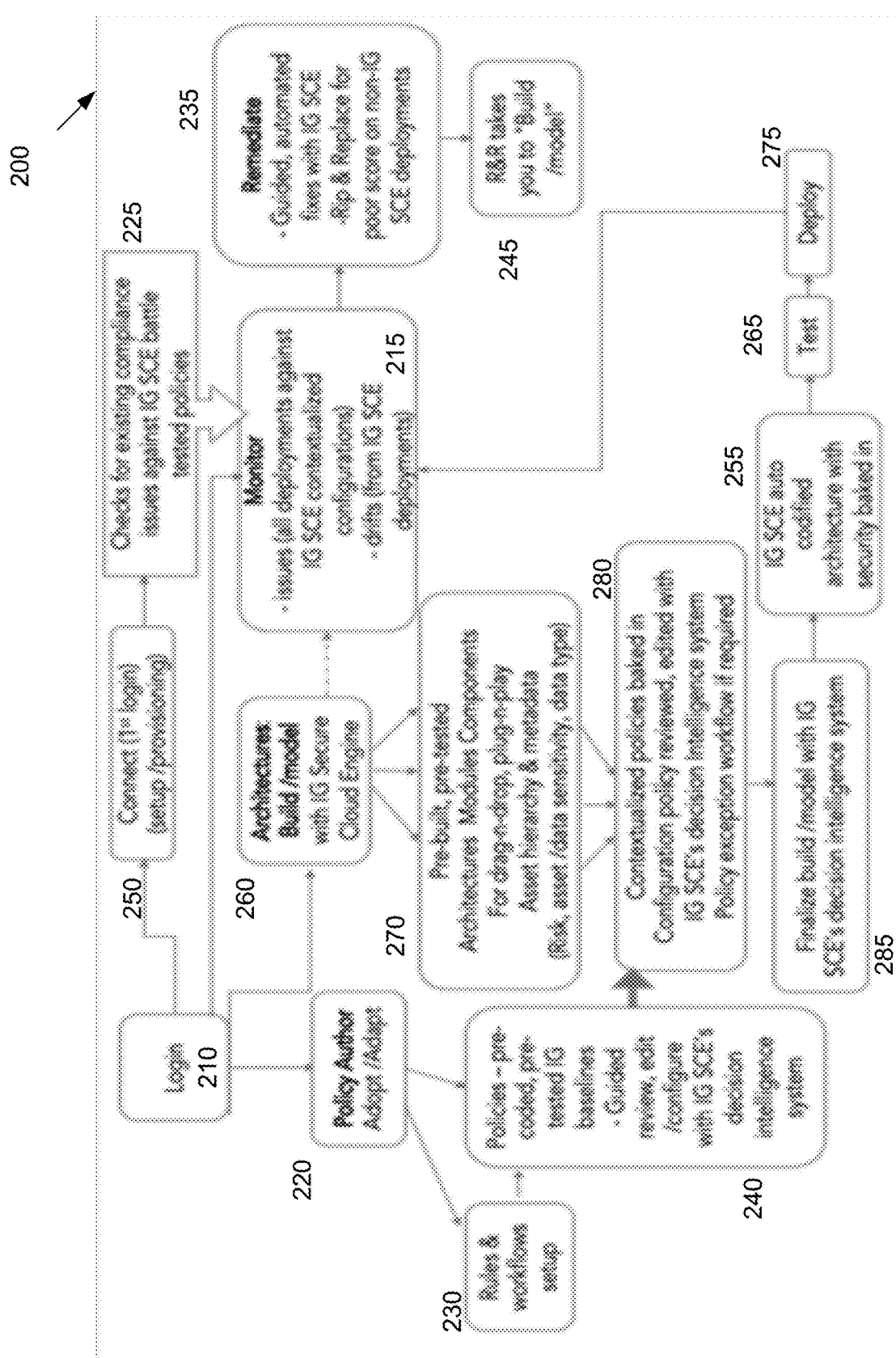
FIG. 2 shows the high level workflow and processes of the invention, the Cloud Security Engine (CSE), according to one embodiment.

FIG. 2 is an exploded view-200 of different components/modules plus workflow and processes used in the Cloud Security Engine (CSE) that allow application programming interface (API), hooks, or overlay network connections in a platform or service that hosts different applications. Login module 210 is used to authenticate the user and authorize using the design and deployment tools. The policy author adopts or adapts to the design or business or technical requirements within rules & workflows that are setup at 230. Module 230 provides for configurability for specific security governance workflows for policy changes, deviations, exceptions, approvals, remediation and completion tracking. Module 230 provides for applicability rules for pre-coded policies and security baselines. At 240, feedback from the rules and workflows goes into policies that are pre-coded, pre-tested baselines. The guided workflow helps review, edit or configure policies with Cloud Security Engine's (CSE) decision intelligence system.

The output from 240 goes into contextualized policies 280 designed-in the architectures, modules and components being modeled and deployed. This module also performs configuration that is reviewed and edited with Cloud Security Engine's (CSE) security intelligence system. The module also applies any policy exception workflow based on business need or input if required.

The module 280 also receives input form 270 for pre-built, pre-tested architectures, modules or components as well as contextualization rules for that use case. Module 270 builds and maps drag-n-drop, plug-n-play chosen architectures and components to asset hierarchy and metadata. The modules perform analysis for risk, asset/data sensitivity and data type. The module 270 receives inputs from Architecture Build or module 260 that includes drag-n-drop, plug-n-play pre-built, pre-tested, architectures, modules, components based in the Cloud Security Engine (CSE). A person of ordinary skill in the art would understand that the modular approach described herein, allows the Cloud Security Engine (CSE) to include and upgrade with new pre-built, pre-tested architectures.

The module 280 gives output to 285 that is used to finalize build/model with Cloud Security Engine's (CSE) decision intelligence system. The module 255 uses the output from 285 to build auto codified architecture that has security built-in. The module 265 is used to test the deployment of the new architecture, configurations and components. The module 275 is used to deploy the tested and secure infrastructure and software.

After the infrastructure, services, applications and software components are deployed, after login 210, module 215 is used to monitor the deployed software. The monitor can identify issues with all deployments against contextualized configurations and drifts. Any detected red flags or alarms can be fed into module 235 to provide remedies. The remedies include guided, automated fixes with the Cloud Security Engine (CSE) that is contextualized and follows defined workflows. The rip and replace process is used for poor IG Cloud Security Engine (CSE) compliance assessment scores on legacy or non-Invi Grid Cloud Security Engine (CSE) (the invention) deployments. At module 245, rip and replace takes you to Build/Model.

After login 210, the user can also connect to 250 setup or provisioning. This allows the user to check for existing compliance issues 225 against the Cloud Security Engine (CSE) tested policies. It also ensures that high level policies and contextual information is set up.

Figure 3:
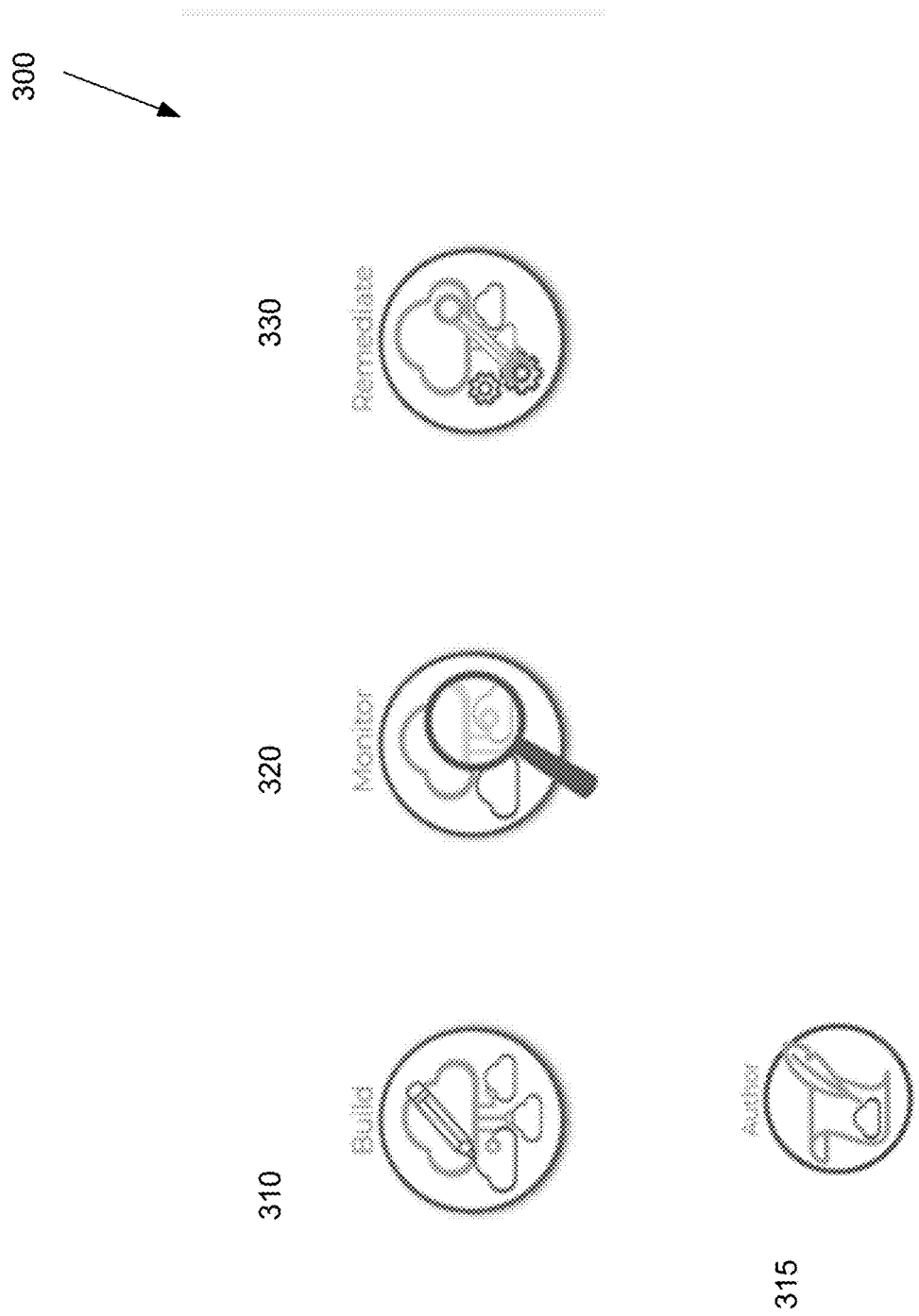
FIG. 3 is a staged view of different modules and processes at high level, according to one embodiment.

FIG. 3 outlines 300 showing actions related to the Cloud Security Engine (CSE) that go towards 310 Build or 315 Author. 310 Build workflow is shown in FIG. 2 starting at 260. 315 Author workflow is represented in FIG. 2 starting at 220. The other option is 320 monitor with workflow represented in 225 and 215 in FIG. 2. The third option is 330 Remediate with workflow represented in 235 in FIG. 2.

The module 310 build or 315 author helps the designer of the cloud-based infrastructure software in selecting or modifying different pre-built or pre-tested secure components and policies that can be incorporated in the design.

Figure 4:
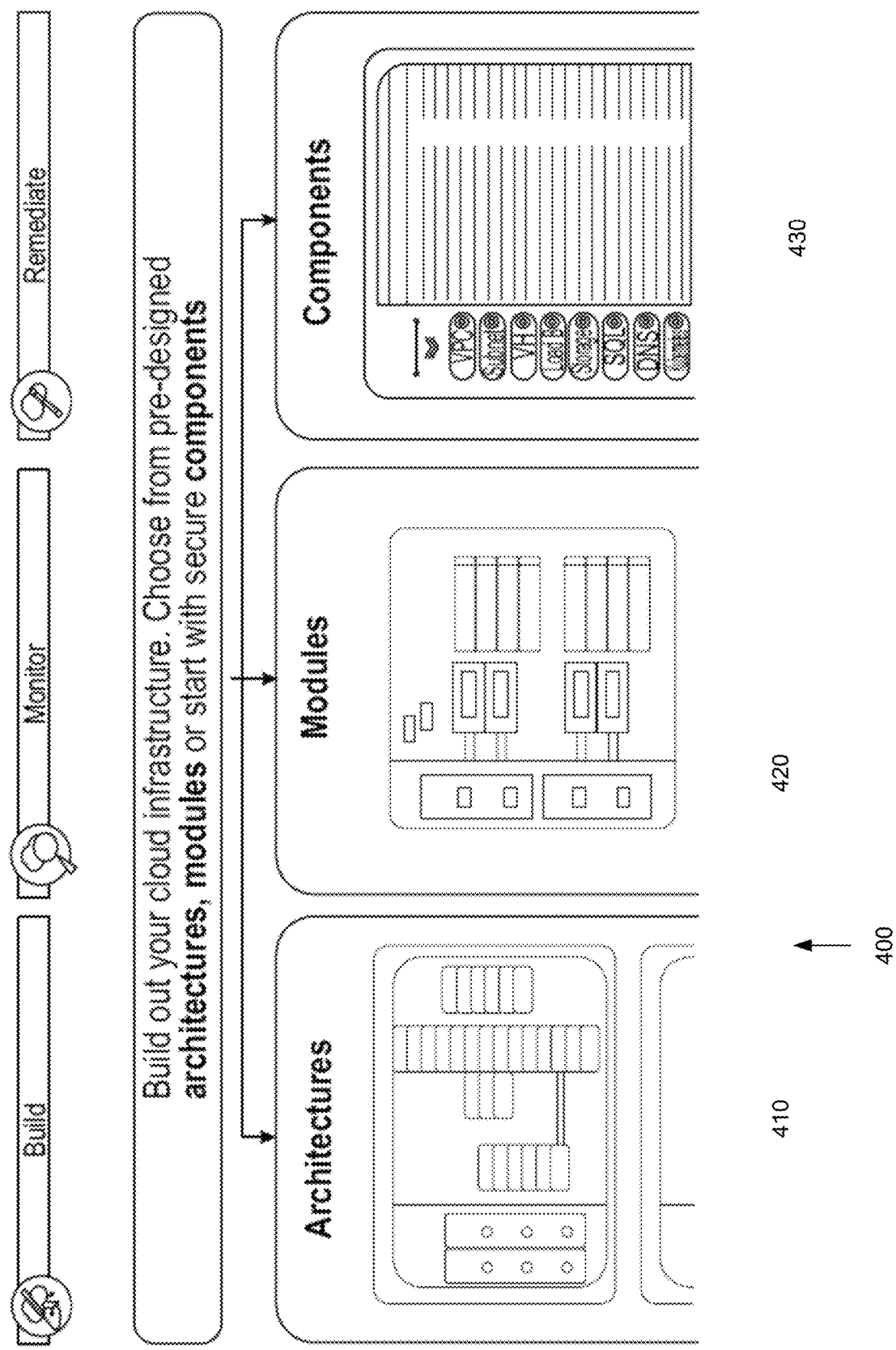
FIG. 4 is a view of navigating and using the invention, the Cloud Security Engine (CSE), architecture model and build, according to one embodiment.

FIG. 4 with 400 shows different options within the build that can be used. 410 is a guide to selecting different architectures. 420 helps guide selection of different modules. 430 helps guide through different components. When the user uses a pre-built architecture or module as shown in FIG. 4, such architecture or model have pre-seeded security policies or baselines.

A person of ordinary skill in the art would understand that a user can decide whether to use all three: architectures, modules or components or mix-match some of these guides. For example, a user may select his or her own architecture and just leverage modules or components. In some instances, a user may use all three.

Figure 5:
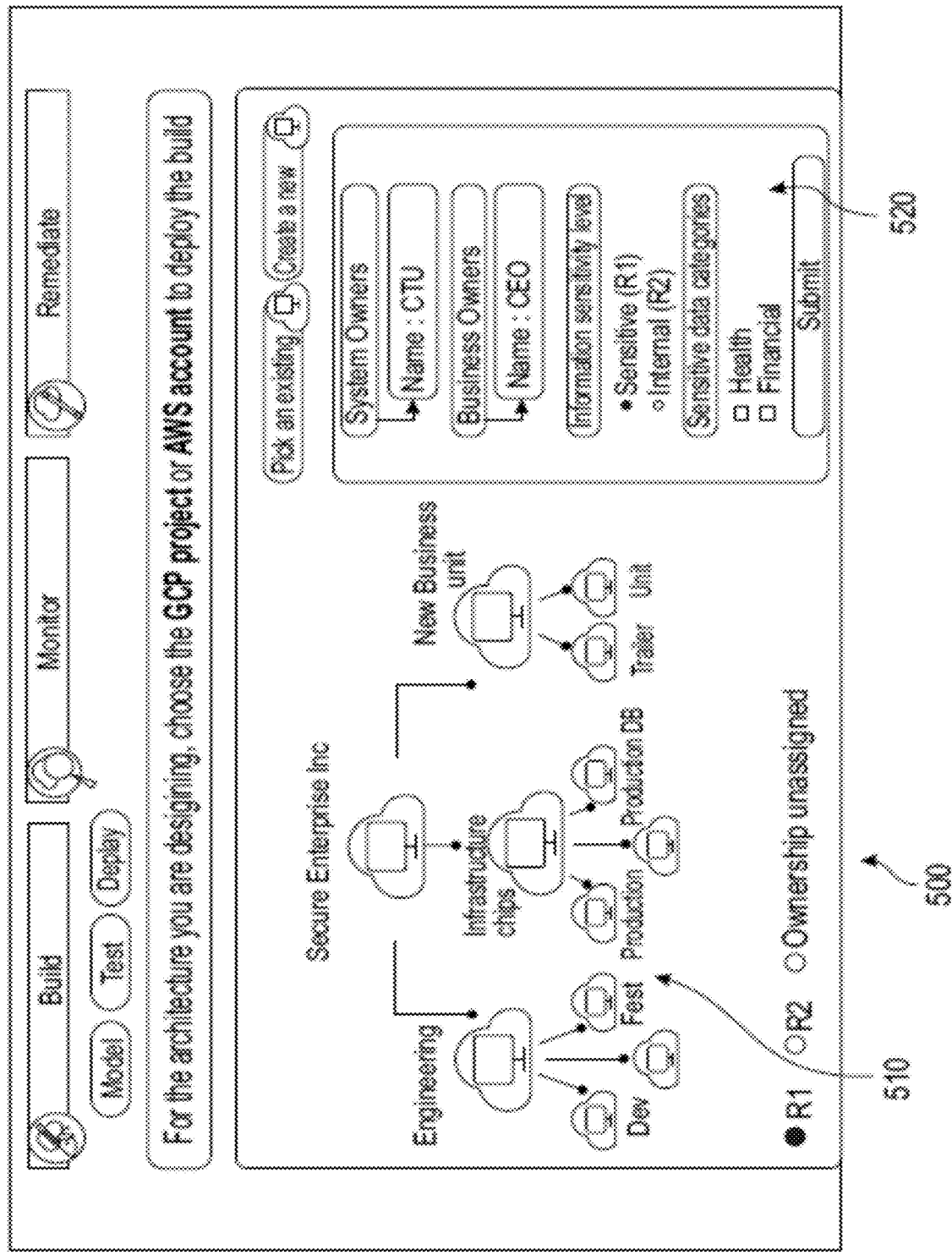
FIG. 5 is a view navigating the Cloud Security Engine (CSE), resource hierarchy design with context and risk information, according to one embodiment.

FIG. 5 with 500 shows an exploded view of asset/resource hierarchy and the different metadata that will be collected for contextualization to be done by the Cloud Security Engine (CSE) for policies and deployments. 510 shows the hierarchy of different cloud resources. FIG. 5 shows how context and risk is specified for the environment in which the component or module or architecture will be deployed. Example, "The Secure Enterprise Inc." with the main overarching control of all different resources is at the top. In the example, Engineering, Infrastructure Ops and Business Units are three different example parts of the main business. Further subcomponents or categories are displayed for each of the categories. For example, each business function, Infrastructure and services deployed under any node in the hierarchy will have configuration rules contextualized based on the metadata including that collected in interface 520. Contextual and risk information including asset ownership and risk categorization can be configured using an easy to use interface at 520.

Figure 6:
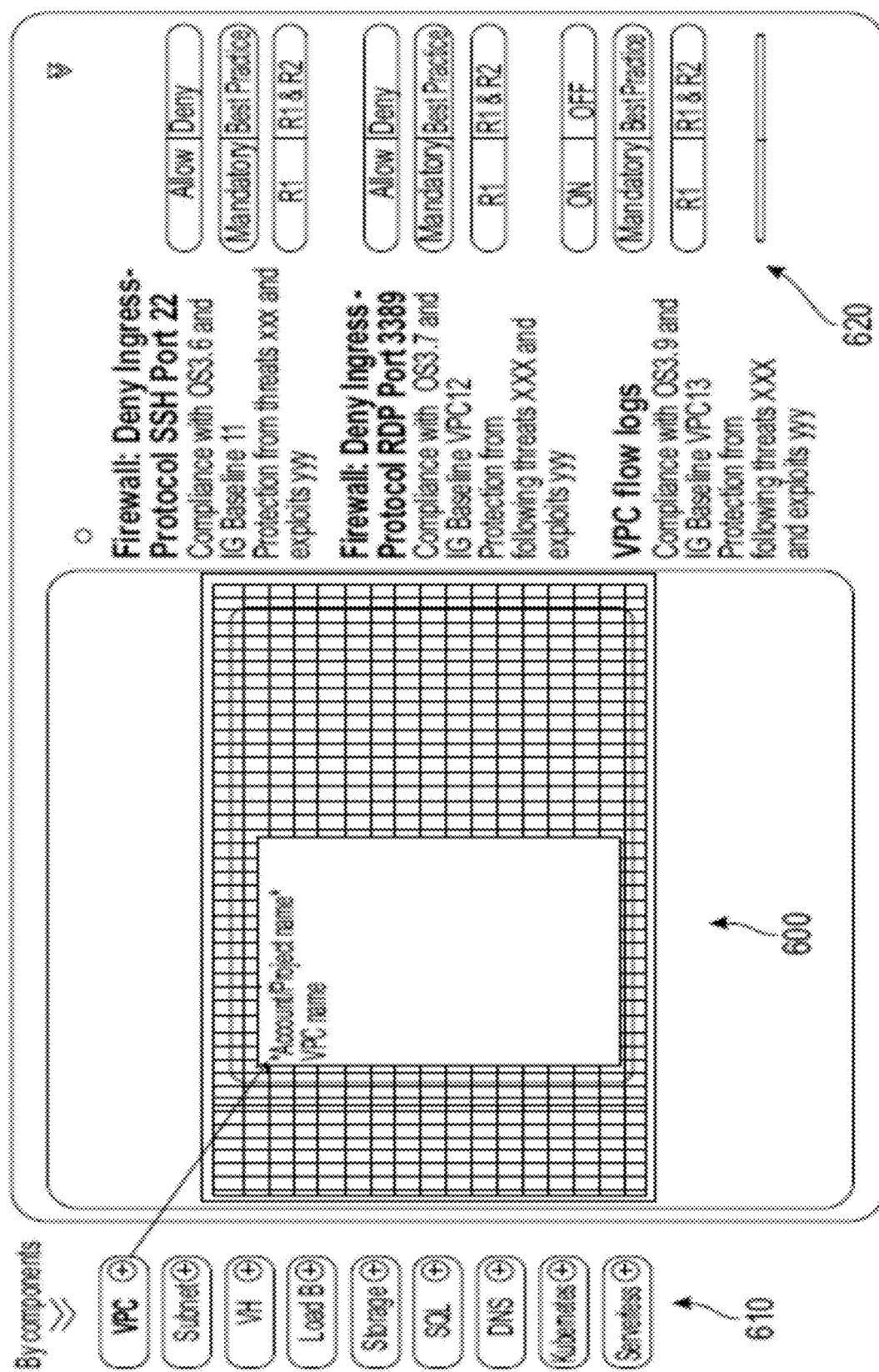
FIG. 6 is a view showing design using components with security baked in, according to one embodiment

FIG. 6 depicts 600 view illustrating an example of using different components while building a new cloud-based architecture. 610 shows different available components. FIG. 6 is example of pre-seeded in, design in, or baked in security. The security policy baseline on the right is pre-seeded when they drag the Virtual Private Cloud ("vpc") component on the graph. When a user drags one or more, the user creates a module or architecture. 600 is the design window that allows different components to be dragged or dropped into the window. 620 shows a detailed configuration view for each of the components that is selected. For example, the recommended policies based on the component's context are displayed with, for example, different colors such as red, green, orange or grey, symbols or other such indicators. If colors are used, then for example, selecting a green policy or parameter may identify the recommended policy. A user can override such recommendations and design a system that does not meet the baseline guidance, but Cloud Security Engine (CSE) may require approvals as determined by the workflow rules which have been configured by the organization. Selecting a green policy, for example, shows that the policy is pre-approved and recommended by the Cloud Security Engine (CSE). Deviations from or approved exceptions from the IG recommended policy or parameter will be shown with different colors, symbols or indicators. For example, orange policy could depict a policy that was not originally recommended by the CSE but approved for use by the company within context.

In a broad embodiment, the invention is systems and methods of Cloud Security Engine (CSE) that allows new cloud-based infrastructure and services design, testing and deployment. The infrastructure or application customized or deployed may be used for a website or for complex software customized by a company.

The designer can leverage the secure infrastructure design concepts with ease and efficiency.

Figure 7:
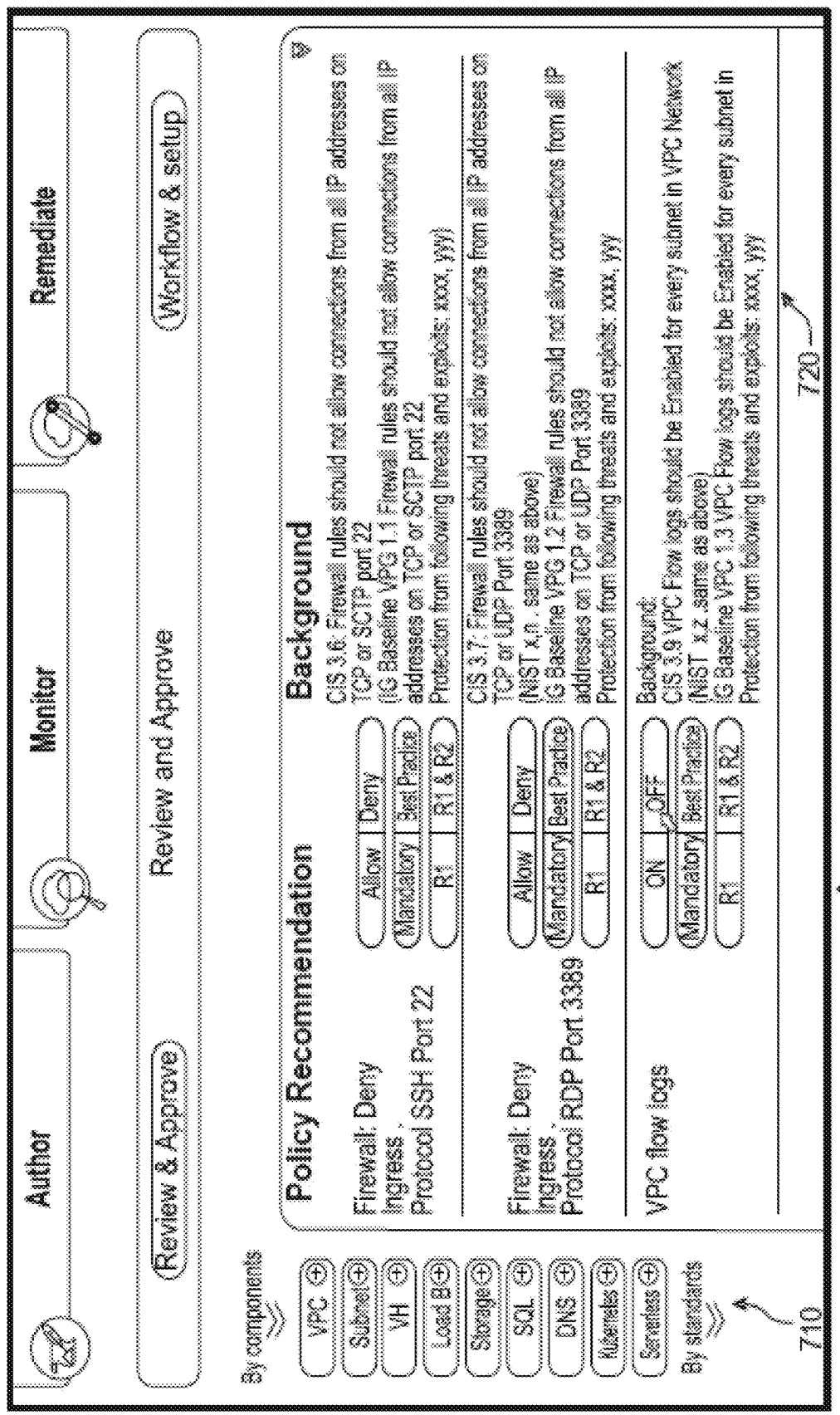
FIG. 7 is a view on recommended policies with risk mapping, according to one embodiment.

FIG. 7 shows different pre-coded, pre-tested, standards compliant, risk reduction policy recommendations 700 with regards to different cloud components and services, computing software designs techniques depicted with background and decision intelligence for each policy. FIG. 7 shows the pre-coded policies or baselines that will be seeded in the components (FIG. 6) or modules or architectures. For example, modules or architectures can include one or more components. With such guidance, a designer can make decisions that are based on well-versed, understood and informed factors including standards, threats, exploits and risks. This eliminates blindly shooting for a system that is secure. 710 shows different components that have corresponding policies at 720 that are associated with one or more of those components to be used in the cloud-based deployment. Any changes, exceptions, deviations, approvals, contextualization are based on workflows and rules set in the CSE to meet enterprise needs for risk management and governance. The deployed system is tested to confirm that the use of the different secure architectures, modules and components is overall secure.

A person of ordinary skill in the art would appreciate that Cloud Security Engine (CSE) takes out the guesswork of making a cloud-based deployment secure.

Figure 8:
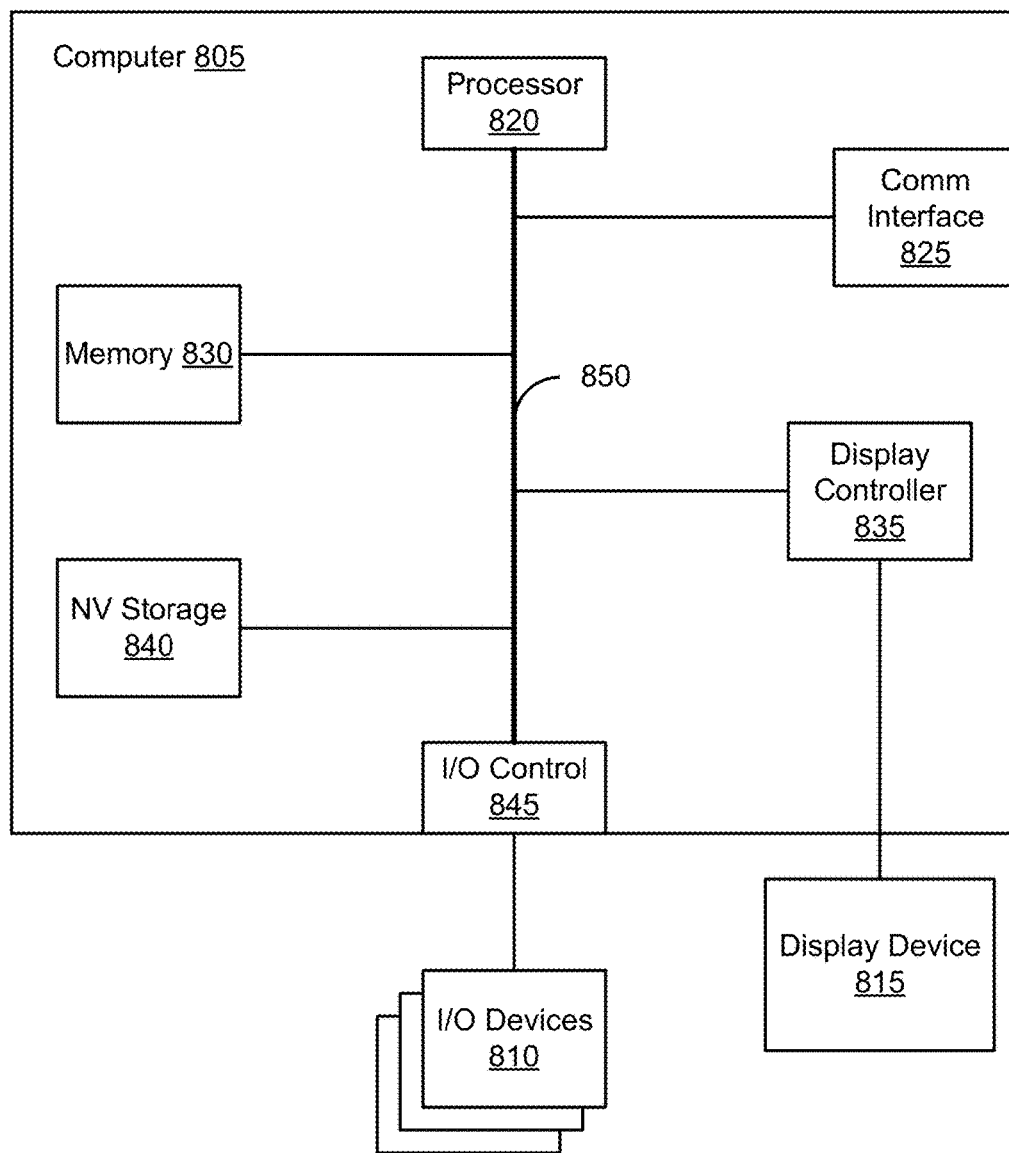
FIG. 8 is a schematic diagram of exemplary computing devices that can be used to implement the methods and systems disclosed herein, according to one embodiment.
Figure 9:
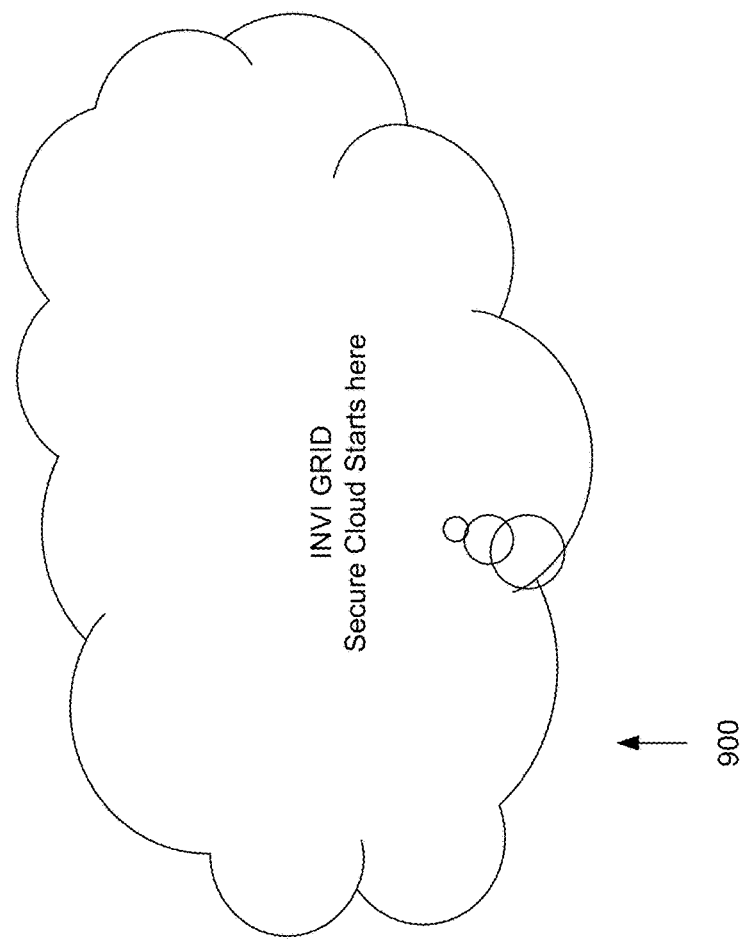
FIGS. 9-16 are slides about the Cloud Security Engine (CSE).
Figure 10:
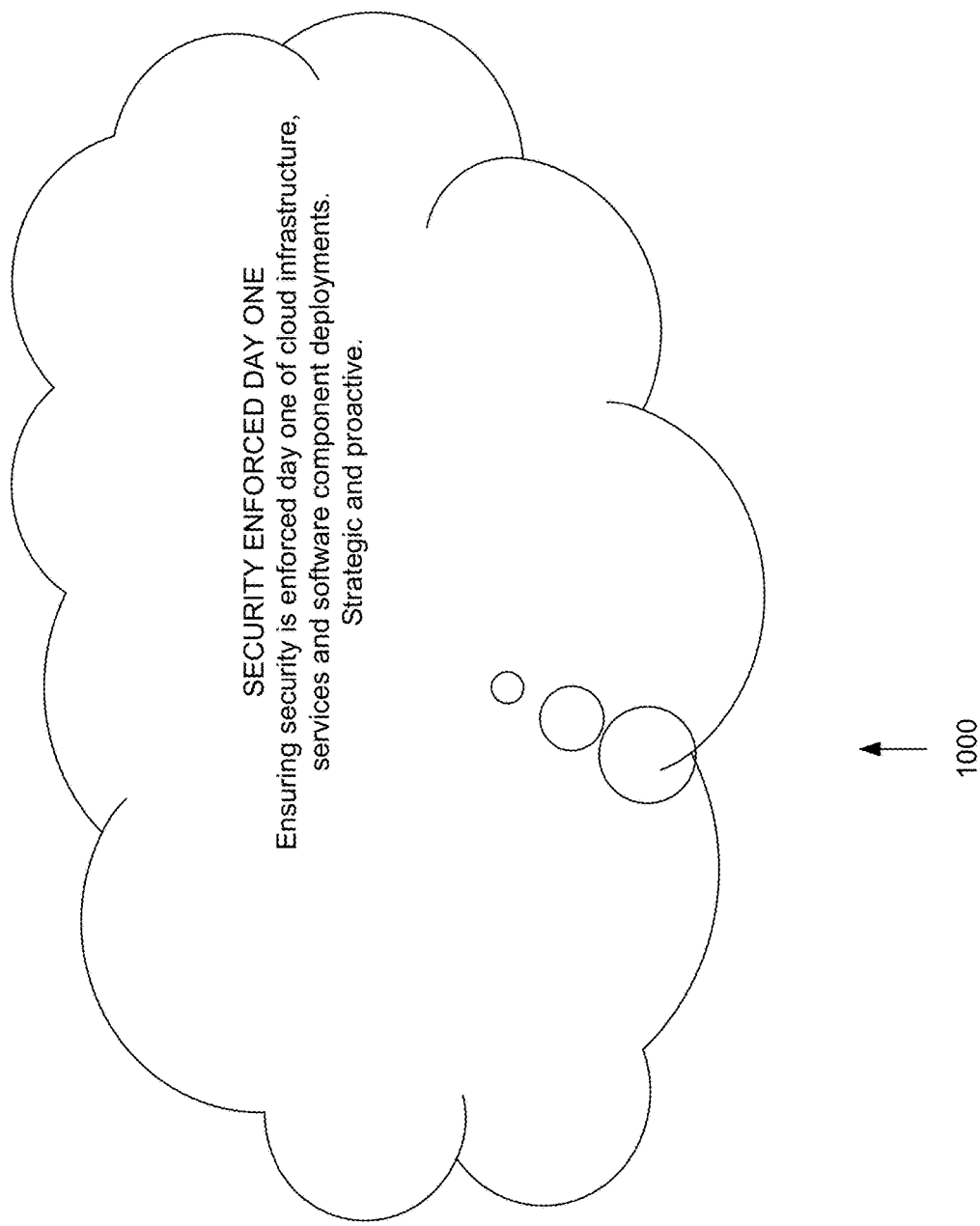
Figure 11:
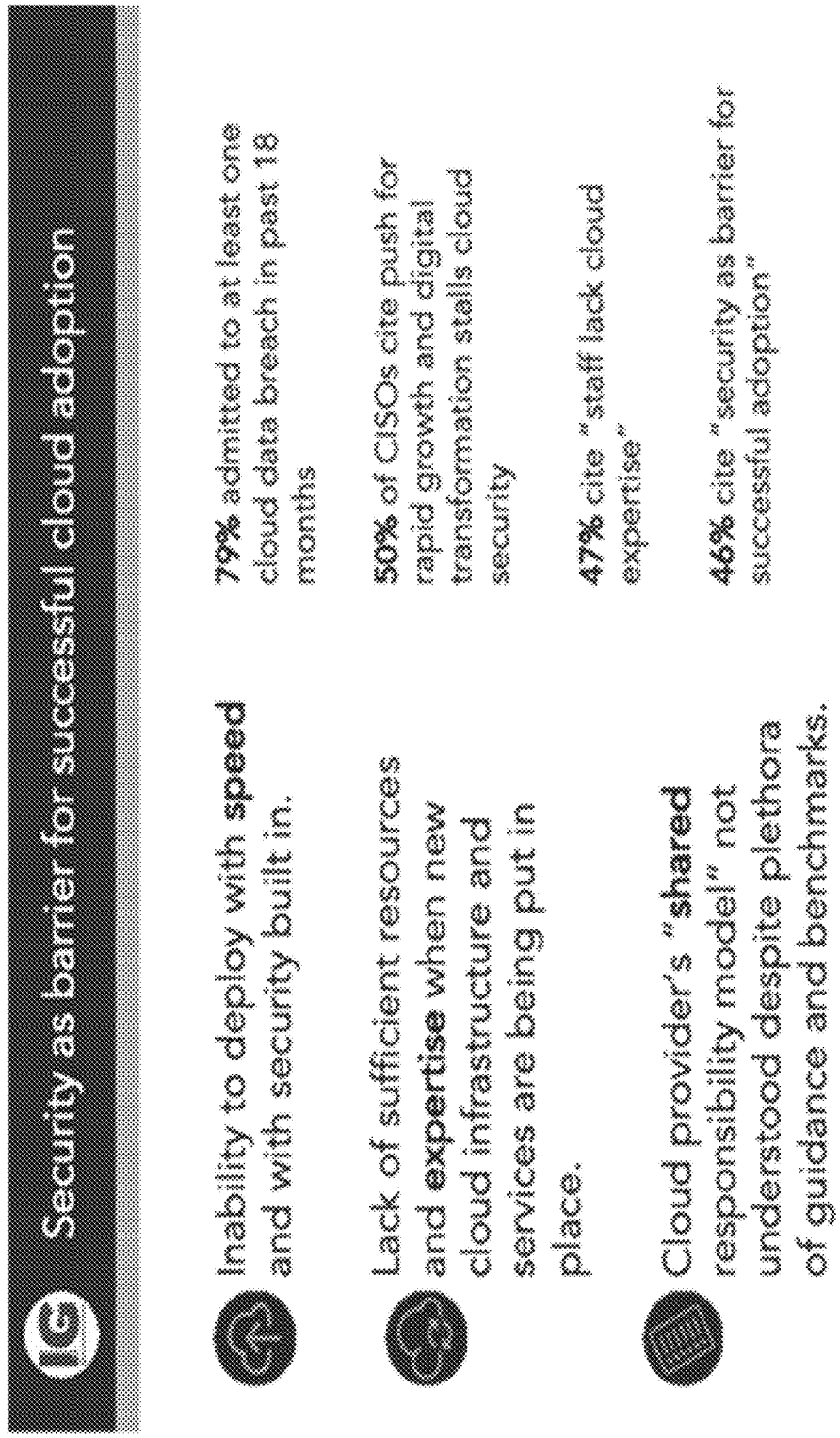
Figure 12:
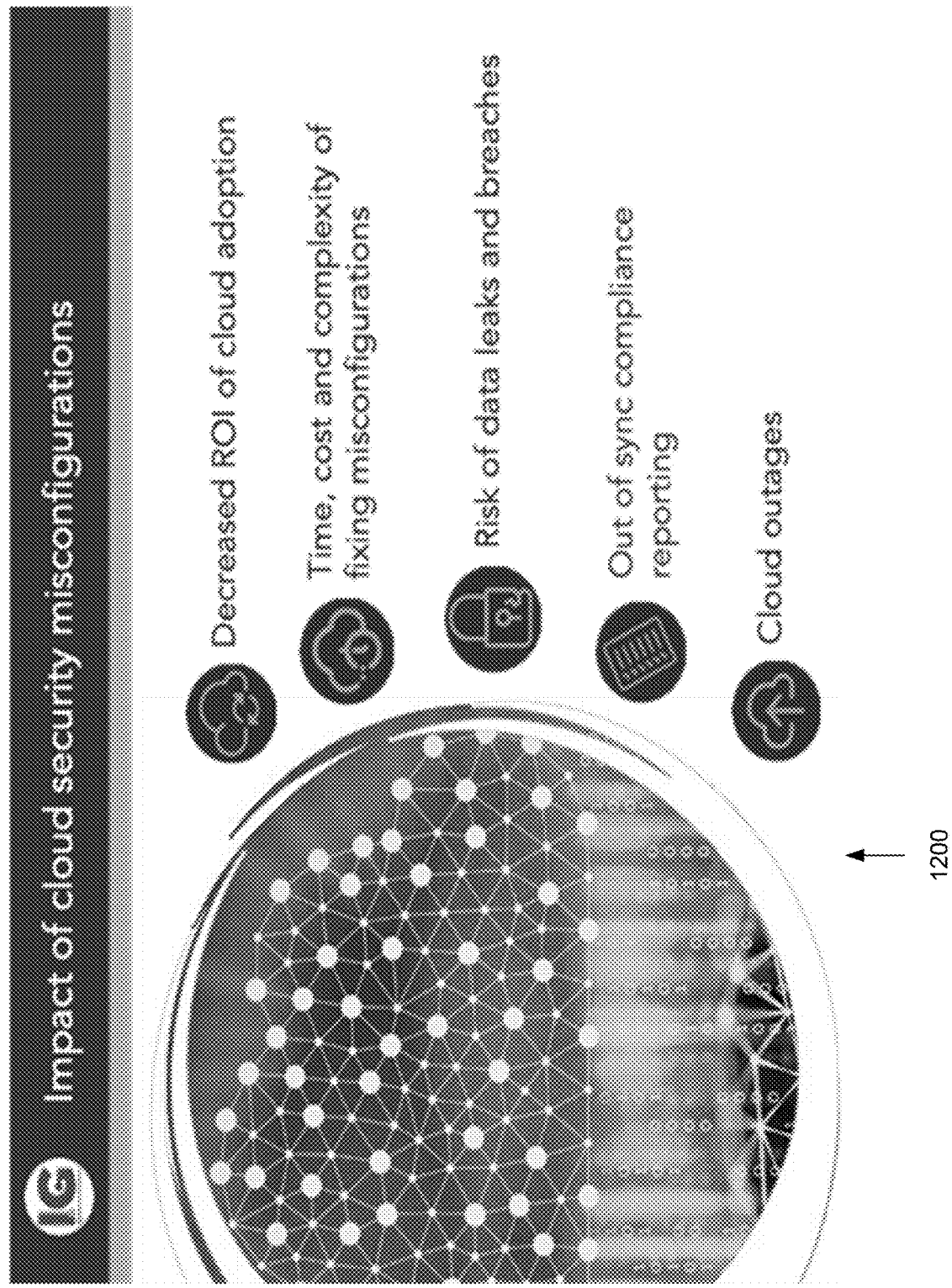
Figure 13:
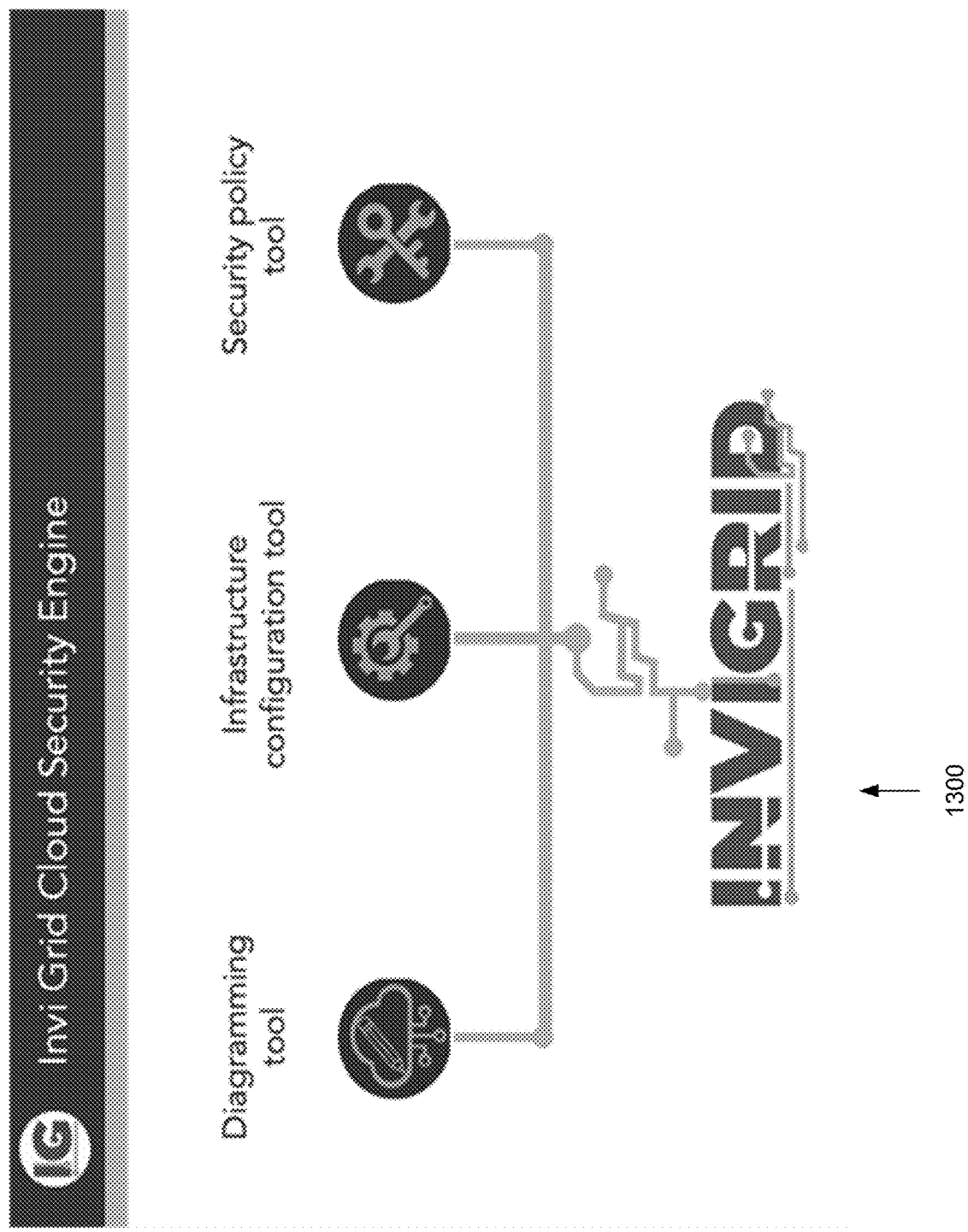
Figure 14:
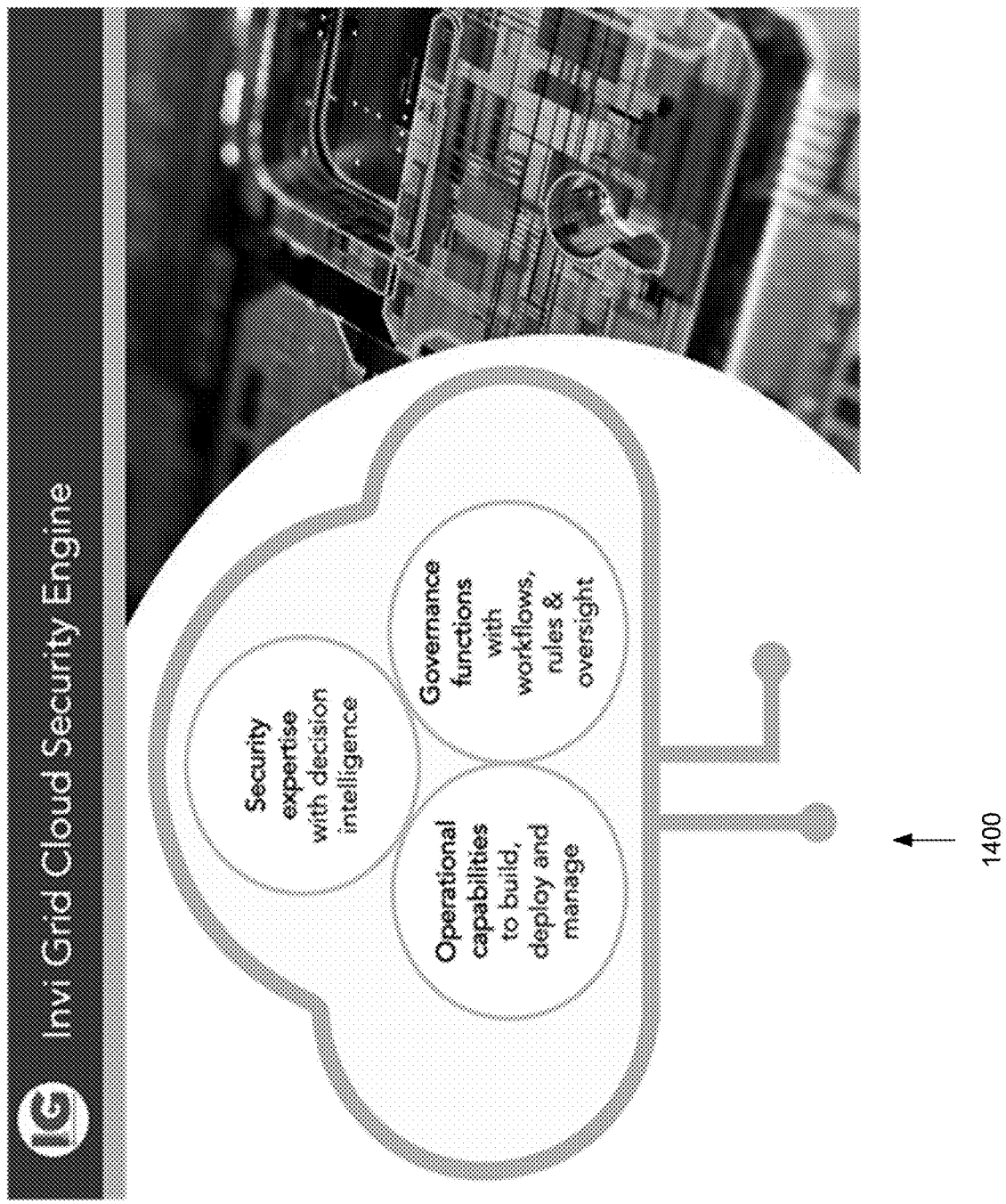
Figure 15:
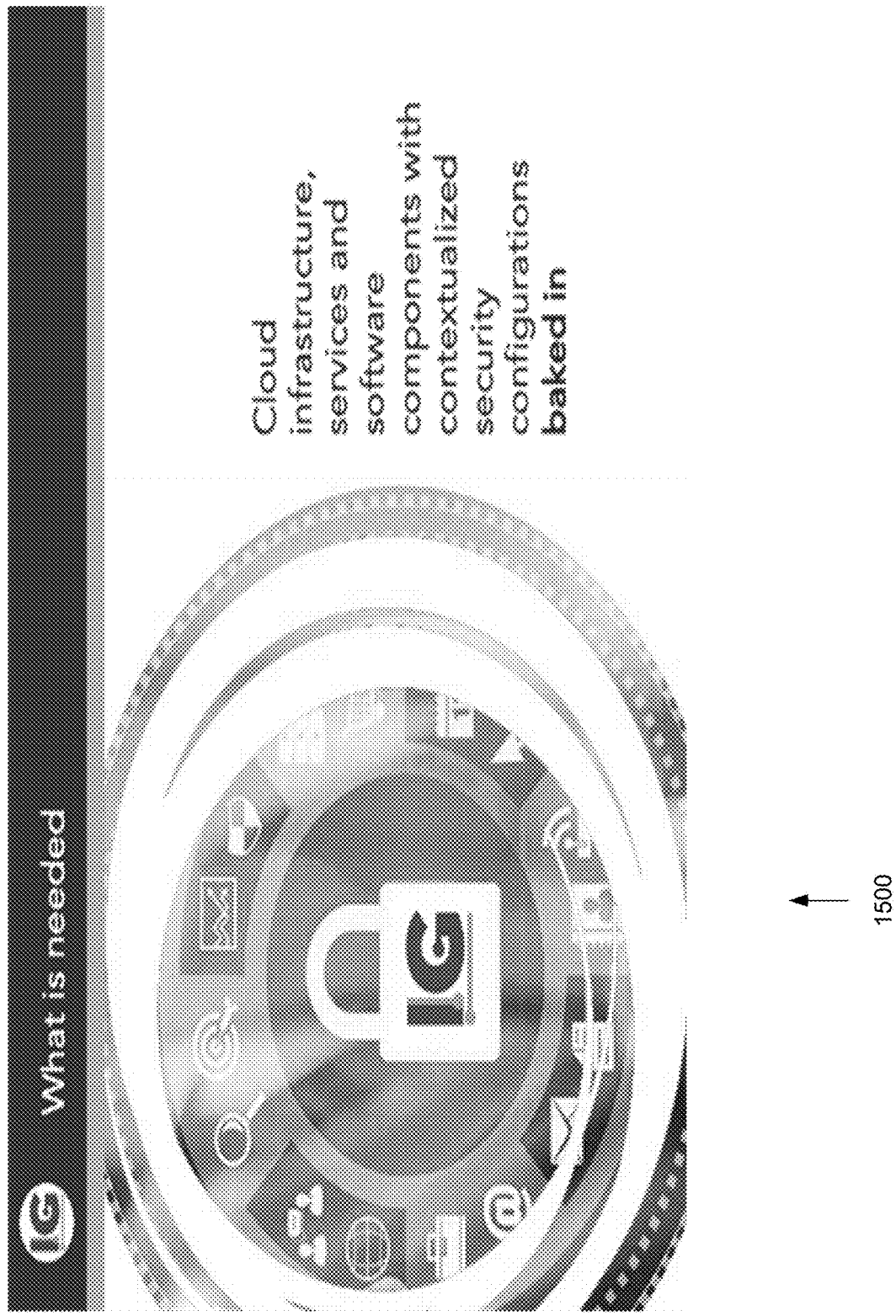
Figure 16:
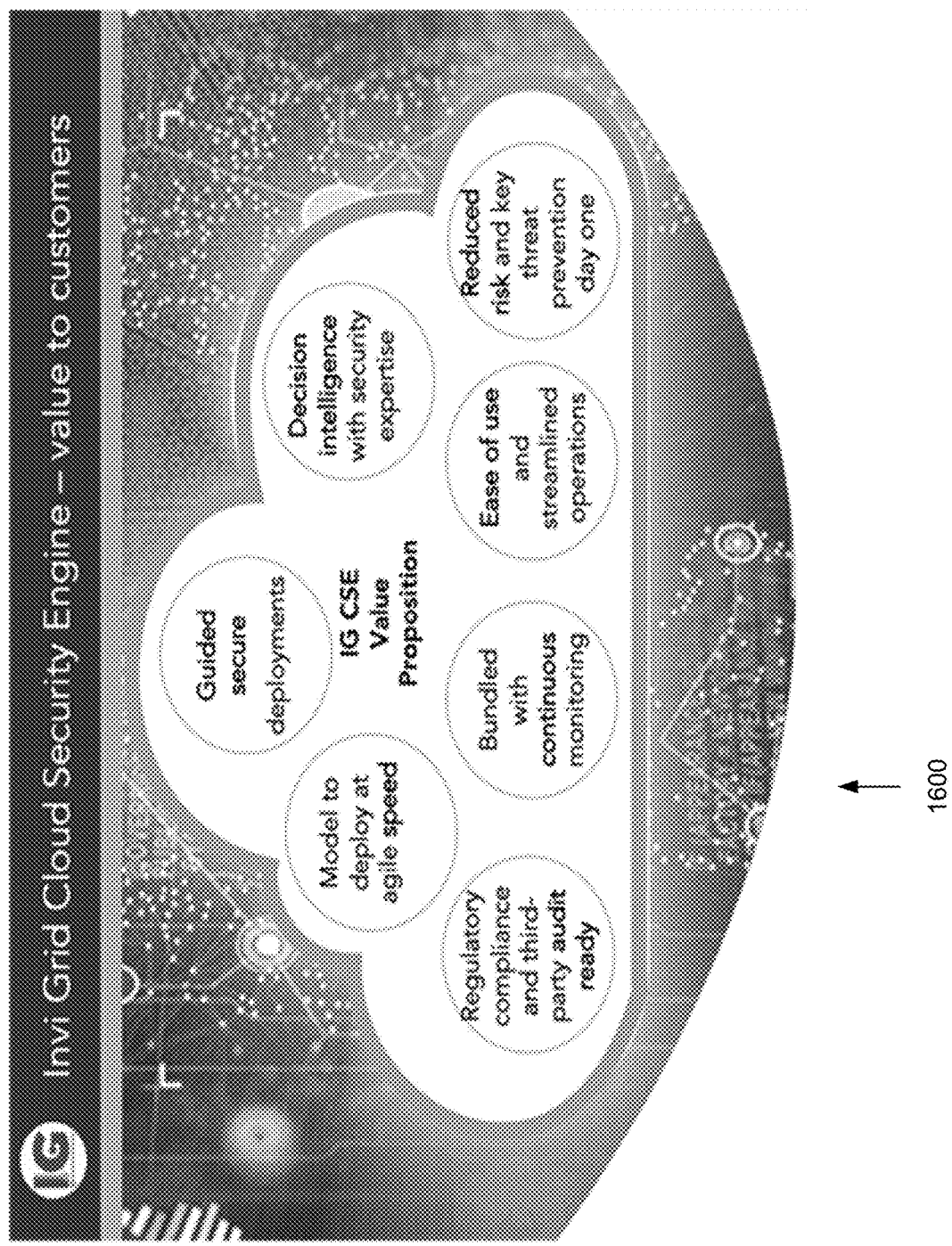

FIG. 8 shows an example of a computing device 800 on which techniques described here can be implemented and which could operate in a highly virtualized, software-defined cloud environment. The computing device 800 can be a conventional computer system or a virtual computer system that can be used as a client computer system, such as a wireless client or a workstation, or a server computer system. The computing device 800 includes a computer 805, I/O devices 810, and a display device 815. The computer 805 includes a processor 820, a communications interface 825, memory 830, display controller 835, non-volatile storage 840, and I/O controller 845. The computer 805 may be coupled to or include the I/O devices 810 and display device 815. The computing device is referenced in FIG. 1 description.

The computer 805 interfaces to external systems through the communications interface 825, which may include a modem or network interface. It will be appreciated that the communications interface 825 can be considered to be part of the computing device 800 or a part of the computer 805. The communications interface 825 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems, including virtualized interfaces and networks.

The processor 820 may be, for example, a conventional microprocessor such as an Intel Pentium microprocessor or Motorola power PC microprocessor or a virtualized processor. The memory 830 is coupled to the processor 820 by a bus 850. The memory 830 can be Dynamic Random Access Memory (DRAM) and can also include Static RAM (SRAM). The bus 850 couples the processor 820 to the memory 830, also to the non-volatile storage 840, to the display controller 835, and to the I/O controller 845, all of which may be virtual, or software-defined components.

The I/O devices 810 can include a keyboard, disk drives, printers, a scanner, and other input and output devices, including a mouse, other pointing device, voice input and recognition devices. The display controller 835 may control in the conventional manner a display on the display device 815, which can be, for example, a cathode ray tube (CRT), liquid crystal display (LCD) or other augmented reality or virtual device and/or display techniques. The display controller 835 and the I/O controller 845 can be implemented with conventional well-known technology.

The non-volatile storage 840 is often a magnetic hard disk, an optical disk, or another (possibly software-defined virtual) medium or form of storage for large amounts of data. Some of this data is often written, by a direct memory access process, into memory 830 during execution of software in the computer 805. One of skill in the art will immediately recognize that the terms "machine-readable medium" or "computer-readable medium" includes any type of storage device that is accessible by the processor 820 and also encompasses a carrier wave that encodes a data signal.

The computing device 800 is one example of many possible computer systems that have different architectures including virtualized, software-defined cloud systems and services. For example, personal computers based on an Intel microprocessor often have multiple buses, one of which can be an I/O bus for the peripherals and one that directly connects the processor 820 and the memory 830 (often referred to as a memory bus). The buses are connected together through bridge components that perform any necessary translation due to differing bus protocols.

Network and virtual computers are another type of computer system that can be used in conjunction with the teachings described here. Network computers do not usually include a hard disk or other mass storage, and the executable programs are loaded from a network connection into the memory 830 for execution by the processor 820. A Web TV system, which is known in the art, is also considered to be a computer system, but it may lack some of the components shown in FIG. 8, such as certain input or output devices. A typical computer system will usually include at least a processor, memory, and a bus coupling the memory to the processor.

Though FIG. 8 shows an example of the computing device 800, it is noted that the term "computer system," as used here, is intended to be construed broadly as a physical computer system or a virtualized computer system and components. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 8.

The memory can include, by way of example but not limitation, random access memory (RAM), such as dynamic RAM (DRAM) and static RAM (SRAM). The memory can be local, remote, distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware. Memory may also be virtualized with associated virtual software-defined components and system services.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage. The computer system may run with or without a hypervisor or containerized programs.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network, either physical or virtual.

FIGS. 9-16 show slides describing functionality of the Cloud Security Engine (CSE).

Several components described here, including Virtual Private/Public Clouds (VPCs), Virtual Machines (VMs), Virtual Load Balancers (VLBs), other virtualized resources and all other components and services available for deployment in a cloud, clients, servers, and engines, can be compatible with or implemented using a cloud-based computing system.

A person of ordinary skill in the art would understand that different modules or components described herein could be implemented using a cloud-based computing system. Such systems can involve a subscription for services or use a utility pricing model. Users can access the protocols of the private network through a web browser or other container application located on their client system.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result.

Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order. The structures and modules in the figures may be shown as distinct and communicating with only a few specific structures and not others. The structures may be merged with each other, may perform overlapping functions, and may communicate with other structures not shown to be connected in the figures.

The above-described functions and components may comprise instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method comprising a Cloud Security Engine for secure cloud configuration with decision intelligence and automation for risk based configuration, implementation, deployment, monitoring and remediation for cloud infrastructure, services and application deployments within one or more cloud environments, with an easy to use point and click or chat interface:
   providing pre-coded, pre-tested, user-configurable customizable secure configuration baselines, policies with options for adoption or adaptation with changes and approval workflows for the organization, environment, deployment or resource;
   providing drag and drop architectures, modules or components pre-seeded automatically with one or more secure configurations;
   providing guidance and decision intelligence for adopting or adapting and implementing the one or more secure configurations;
   automatically and autonomously applying the one or more secure configurations based on provided guidance and decision intelligence during build,-deploy, monitor or run time based on context and risk information for a cloud environment in production;
   automatically analyzing the applied security configurations;
   tracking and reporting the applied security configurations with workflows, setup and status adoption, changes, exceptions, adaption, implementation of the one or more secure configurations.

2. The method of claim 1, wherein the point and click or chat interface further comprising a user interface that includes requesting, reviewing, authoring, approving, adopting, adapting, modifying the configuration baselines, policies or options.

3. The method of claim 2, further comprising:
   applying, testing or implementing automatically or autonomously context aware variations and approved exceptions for the configuration baselines, policies or options at design;
   modeling, testing, deployment and monitoring stages, and configuring and maintaining workflow, setup and status.

4. The method of claim 1, further comprising:
   point in time and ongoing reporting of the risk score or level of the cloud environments; and
   mappings of drifts and deviations from secure configuration options adopted, adapted or autonomously applied to architectures and components built and deployed with the engine along with their severity and priority levels based on policy, context and risk.

5. The method of claim 1, further comprising:
   escalating configuration issues, changes or time-based alerting related to risk and non-compliance with organizational or standards-based policies; or
   requesting, approving and maintaining exceptions;
   guiding remediation action with fix intelligence or automatically; and
   autonomously remediating with scheduling, tracking testing and deployment to maintain security for the cloud environment.

6. The method of claim 1, wherein the secure cloud environment includes cloud infrastructure services or software applications.

7. The method of claim 1, further comprising: continuously maintaining, implementing or deploying to support orchestration of a multi-cloud environment or a hybrid cloud environment.

8. The method of claim 1, wherein the secure cloud environment is compatible with one or more Cloud Service Providers (CSPs) including, but not limited to: Amazon Web Services (AWS), Google Compute Platform (GCP) and Microsoft Azure as well as third party solutions, partners and SaaS providers.

9. The method of claim 1, wherein the secure cloud environment is compatible with private clouds.

10. The method of claim 1, wherein architectures of the secure cloud environments pre-seeded with secure configurations applied based on context and risk is displayed diagrammatically in a user interface.

11. A system comprising a Cloud Security Engine for secure cloud configuration with decision intelligence and automation for risk based configuration, implementation, deployment, monitoring and remediation for cloud infrastructure, services and application deployments within one or more cloud environments, with an easy to use point and click or chat interface:
   a computing device configured to:
      provide pre-coded, pre-tested, user-configurable customizable secure configuration baselines, policies with options for adoption or adaptation with changes and approval workflows for the organization, environment, deployment or resource;
      provide drag and drop architectures, modules or components pre-seeded automatically with one or more secure configurations;

provide guidance and decision intelligence for adopting or adapting and implementing the one or more secure configurations;

automatically and autonomously apply the one or more secure configurations based on provided guidance and decision intelligence during build, deploy, monitor and run time based on context and risk information for a cloud environment in production;

automatically analyze the applied security configurations;

track and report the applied security configurations with workflows, setup and status adoption, changes, exceptions, adaption, implementation of the one or more secure configurations.

12. The system of claim 11, wherein the point and click or chat interface further comprising a user interface that includes requesting, reviewing, authoring, approving, adopting, adapting, modifying the configuration baselines, policies or options.

13. The system of claim 12, wherein the computing device is further configured to: apply, test or implement automatically or autonomously context aware variations and approved exceptions for the configuration baselines, policies or options at design; model, test, deploy and monitor stages, and configure and maintain workflow, setup and status.

14. The system of claim 11, wherein the computing device is further configured to: point in time and ongoing report of the risk score or level of the cloud environments; and map drifts and deviations from secure configuration options adopted, adapted or autonomously applied to architectures and components built and deployed with the engine along with their severity and priority levels based on policy, context and risk.

15. The system of claim 11, further comprising:

escalate configuration issues, changes or time-based alerting related to risk and non-compliance with organizational or standards-based policies; or request, approve and maintain exceptions;

guide remediation action with fix intelligence or automatically; and autonomously remediate with scheduling, track testing and deployment to maintain security for the cloud environment.

16. The system of claim 11, wherein the secure cloud environment includes cloud infrastructure services or software applications.

17. The system of claim 11, further comprising: continuously maintain, implement or deploy to support orchestration of a multi-cloud environment or a hybrid cloud environment.

18. The system of claim 11, wherein the secure cloud environment is compatible with one or more Cloud Service Providers (CSPs) including, but not limited to: Amazon Web Services (AWS), Google Compute Platform (GCP) and Microsoft Azure as well as third party solutions, partners and SaaS providers.

19. The system of claim 11, wherein the secure cloud environment is compatible with private clouds.

20. The system of claim 11, wherein architectures of the secure cloud environments pre-seeded with secure configurations applied based on context and risk is displayed diagrammatically in a user interface.

* * * * *